T. P. SHOEMAKER.
MOTOR FOR AUTOMOBILE WASHING BRUSHES.
APPLICATION FILED APR. 10, 1920.
1,433,160.
Patented Oct. 24, 1922.
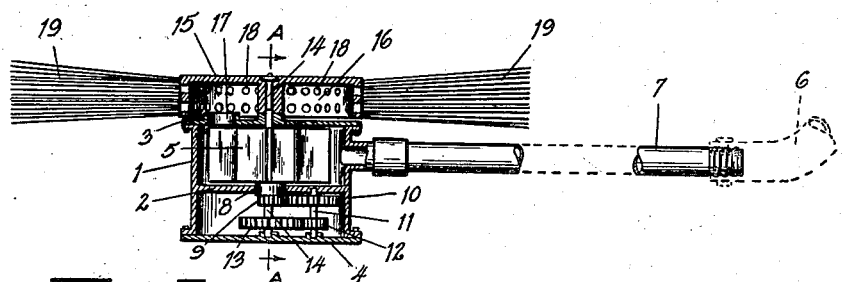
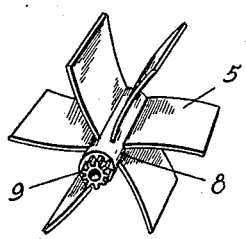
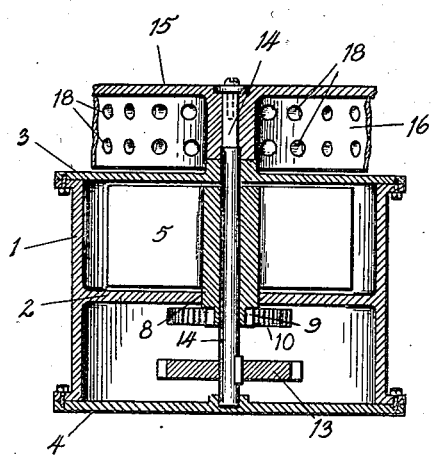
WITNESS
INVENTOR
T. P. Shoemaker.
BY
ATTORNEYS Patented Oct. 24, 1922.

1,433,160

UNITED STATES PATENT OFFICE.

THOMAS P. SHOEMAKER, OF BRIDGETON, OREGON, ASSIGNOR OF ONE-HALF TO CHARLES H. COPELAND, OF PORTLAND, OREGON.

MOTOR FOR AUTOMOBILE WASHING BRUSHES.

Application filed April 10, 1920. Serial No. 372,900.

*To all whom it may concern:*

Be it known that I, THOMAS P. SHOEMAKER, a citizen of the United States, residing at Bridgeton, in the county of Multnomah and State of Oregon, have invented new and useful Motors for Automobile Washing Brushes, of which the following is a specification.

My invention relates to improvements in automobile washing brushes in which a stream of water entering through the handle of my device supplies motive power and clean water for a rotary brush.

The objects of my invention are: to produce a machine which will clean an automobile quickly of dust and dirt; which is convenient to manipulate; and which can be attached to any water faucet.

Other objects consist in the combination and arrangement of parts as will be described hereafter.

I attain these objects with the mechanism illustrated in the accompanying drawings, in which:

Fig. I is a cross section through my device illustrating the interior construction.

Fig. II is an enlarged section of Fig. I along the line A—A.

Fig. III is a plan view of the housing without the brush.

Fig. IV is a perspective view of the propelling wheel.

Similar numerals refer to similar parts throughout the several views.

Contemplating Fig. I we notice a cylindrical housing 1 which is separated by the dividing wall 2 into an upper and lower chamber. The upper chamber is closed by a cover 3 and the lower by a cover 4. A propelling wheel 5 within the upper chamber is rotated by a current of water received from the hose 6 through the hollow handle 7. The hub on one end of the propelling wheel is extended to form a journal 8 in the dividing wall and extending further into the lower chamber is shaped as a pinion 9 which meshes with the gear 10 on the counter shaft 11. A pinion 12 on the same shaft transmits rotation to a gear 13 keyed on the brush shaft 14. The latter extends axially through the hub of the propelling wheel, and farther through the cover 3, and carries at the upper end the circular brush 15. The hub of the brush rotates in fairly close sliding contact with the cover 3, and has an annular chamber 16 for the reception of the spent water as it issues from the upper chamber through the opening 17 in the cover 3. Centrifugal force of the rotating brush drives the water through a large number of apertures 18 in the rim of the hub directly into the bristles 19, and thus keeps them continually supplied with clean water.

Having thus described my invention, it will be seen that my objects have been accomplished, and, though I have shown the preferred form of construction, I reserve to myself the right to make minor changes, providing I do not contravene the spirit and principle of my invention.

I claim:

1. In a motor for an automobile washing brush, the combination of a tubular housing, flat covers at each end of the housing, a division wall cast integrally with the housing and intermediate the covers, a shaft entering the housing through one cover proceeding through the division wall and rotatably mounted in the opposite cover, a gear keyed on the shaft at one side of the division wall, a propelling wheel rotating freely on the shaft at the other side of the division wall, counter gears actuating the gear on the shaft and being driven by the propelling wheel, and a hollow handle substantially at right angles to the axis of the housing and admitting water to the propelling wheel.

2. In a motor for an automobile washing brush, the combination of a tubular housing, a flat cover at the upper end of the housing, a flat cover at the lower end of the housing, a division wall in the housing intermediate the covers and dividing said housing into two cylindrical compartments, a water wheel rotatably mounted in the upper compartment, a pinion cast integrally with the water wheel and projecting through the division wall into the lower compartment, transmission gears in the lower compartment, said transmission gears being actuated by the pinion on the water wheel, a shaft driven by the transmission gears, said shaft entering through the center of the upper flat cover extending through the division wall and rotatably mounted in the lower cover, and a hollow handle attached to the side of the housing substantially at right angles to the axis of the water wheel.

3. In a motor for an automobile washing brush, the combination of a tubular housing, flat covers closing the upper and lower ends of the housing, a division wall separating said housing into two cylindrical compartments, a propelling wheel in the upper compartment, said propelling wheel having a projecting hub, gear teeth on the projecting hub, said hub extending through the division wall into the lower compartment, a shaft entering centrally through the upper cover, proceeding axially through the hub of the propelling wheel and rotatively supported in the lower flat cover, a gear keyed on the shaft in the lower compartment, a counter shaft in the lower compartment, counter gears on said counter shaft driven from the propelling wheel and transmitting rotation to the central shaft, a hollow handle attached to the side of the cylindrical housing substantially at right angles to the axis of the propelling wheel.

4. In a motor for an automobile washing brush, the combination of a tubular housing, a flat cover at the upper end of the housing, an opening in the cover midway between the center and the circumference, a flat cover at the lower end of the housing, a division wall in the housing between the two covers separating the interior into two cylindrical compartments, a central opening in the division wall, a propelling wheel, a hub projecting from one side of the propelling wheel and extending through the central opening in the division wall, gear teeth forming an integral part of the projecting hub, a shaft rotatably mounted in the two covers of the housing and furnishing a support for the propelling wheel, counter gears in the chamber below the division wall coacting with the gear teeth on the hub to rotate said shaft, and a hollow handle attached to the side of the housing substantially at right angles to the axis of the propelling wheel, whereby a stream of water entering the housing through the handle is discharged through the opening in the cover.

Signed by me at Portland, Oregon, this 31 day of March, 1920.

THOMAS P. SHOEMAKER.